US007182504B2

(12) United States Patent
Wohlrab

(10) Patent No.: US 7,182,504 B2
(45) Date of Patent: Feb. 27, 2007

(54) DRIVE APPARATUS FOR A MULTI-SHAFT EXTRUDER ROTATING IN A SAME DIRECTION

(75) Inventor: Walter Wohlrab, Weissenburg (DE)

(73) Assignee: Krauss-Maffei Kunststofftechnik GmbH, Müchen (DE)

( * ) Notice: Subject to any disclaimer, the term of this patent is extended or adjusted under 35 U.S.C. 154(b) by 133 days.

(21) Appl. No.: 10/980,642

(22) Filed: Nov. 3, 2004

(65) Prior Publication Data

US 2005/0063245 A1     Mar. 24, 2005

Related U.S. Application Data

(63) Continuation of application No. PCT/EP03/04388, filed on Apr. 26, 2003.

(30) Foreign Application Priority Data

May 8, 2002   (DE) ................. 102 20 552

(51) Int. Cl.
B29B 7/46       (2006.01)
(52) U.S. Cl. ......................... 366/83; 366/100
(58) Field of Classification Search ............... 366/100, 366/83, 84, 85; 74/665 B
See application file for complete search history.

(56) References Cited

U.S. PATENT DOCUMENTS

| | | | | |
|---|---|---|---|---|
| 3,359,826 | A * | 12/1967 | Hanslik | 74/665 R |
| 4,170,150 | A * | 10/1979 | Selbach et al. | 74/410 |
| 4,253,345 | A * | 3/1981 | Munster | 74/665 GA |
| 4,586,402 | A | 5/1986 | Schäfer | |
| 5,103,689 | A | 4/1992 | Dollhopf | |
| 6,632,009 | B2 * | 10/2003 | Meyer | 366/100 |
| 7,090,483 | B2 * | 8/2006 | Middelberg | 366/100 |

FOREIGN PATENT DOCUMENTS

| | | |
|---|---|---|
| DE | 846 012 C | 8/1952 |
| DE | 298 05 025 U | 7/1999 |
| DE | 200 22 605 U | 1/2002 |
| FR | 915 763 A | 11/1946 |

* cited by examiner

*Primary Examiner*—Tony G. Soohoo
(74) *Attorney, Agent, or Firm*—Henry M. Feiereisen

(57) ABSTRACT

A drive apparatus for an extruder with at least two co-rotating extruder screws having driveshafts includes a housing and a drive motor which is received in the housing and including a stator and a rotor. The rotor is operatively connected to driveshafts of the extruder screws and has arranged thereon a toothed surface in direct engagement with complementary toothed surfaces of at least two of the driveshafts of the extruder screws.

18 Claims, 1 Drawing Sheet

DRIVE APPARATUS FOR A MULTI-SHAFT EXTRUDER ROTATING IN A SAME DIRECTION

CROSS-REFERENCES TO RELATED APPLICATIONS

This application is a continuation of prior filed copending PCT International application no. PCT/EP03/04388, filed Apr. 26, 2003, which designated the United States and on which priority is claimed under 35 U.S.C. §120, the disclosure of which is hereby incorporated by reference, and which claims the priority of German Patent Application, Serial No. 102 20 552.3, filed May 8, 2002, pursuant to 35 U.S.C. 119(a)–(d).

BACKGROUND OF THE INVENTION

The present invention relates, in general, to a drive apparatus for a multi-shaft extruder rotating in a same direction.

Nothing in the following discussion of the state of the art is to be construed as an admission of prior art.

Conventional multi-screw extruders normally include a drive motor, a step-down gear mechanism to decrease the speed of the drive motor, and a distribution gear mechanism to transfer the power of the drive motor to the extruder screws. These extruder constructions have many drawbacks because they require much space and are bulky and are cost-intensive.

It would therefore be desirable and advantageous to provide an improved drive apparatus for a multi-shaft extruder rotating in a same direction to obviate prior art shortcomings and to require little space while being simple in construction and yet reliable in operation.

SUMMARY OF THE INVENTION

According to one aspect of the present invention, a drive apparatus for an extruder with at least two co-rotating extruder screws having driveshafts, includes a housing, and a drive motor received in the housing and including a stator and a rotor, with the rotor operatively connected to the driveshafts of the extruder screws, wherein the rotor has arranged thereon a toothed surface in direct engagement with complementary toothed surfaces of at least two of the driveshafts of the extruder screws.

As a consequence, when a drive apparatus according to the invention is arranged upon the extruder barrel, the toothed surface of the rotor directly is in mesh with the toothed surfaces of the driveshafts. This configuration thus provides an integrated distribution gear mechanism and thereby significantly contributes to a reduction in space while at the same time simplifies the overall construction.

According to another feature of the present invention, the drive motor may be a hollow-shaft motor, with the stator configured substantially ring-shaped and with the rotor disposed radially inwards in relation to the stator and also configured substantially ring-shaped, wherein the rotor is hollow radially inwards to define a hollow space for recieving the driveshafts of the extruder screws. In this way, the drive apparatus becomes even more compact and allows the use of a motor with high torque to reliably provide the necessary extrusion power. Suitable, when constructing the drive motor in the form of a hollow-shaft motor with internal rotor, it is conceivable to form the toothed surface of the rotor on the inside of the rotor for engagement with teh complementary toothed surfaces of the driveshafts of the extruder shafts. Hereby, the complementary toothed surfaces of the driveshafts of the extruder screws may be realized by externally toothed ring gears. In order to prevent interference between the ring gears of diffrent driveshafts, even when a snug engagement of the extruder screws is involved, it may be suitable to arrange the ring gears in staggered relationship.

According to another feature of the present invention, a sleeve may be provided which is securely fixed to the rotor of the drive motor and constructed to form the internally toothed surface of the rotor. In this way, the internal toothed surface is not directly formed on the rotor, but rather the rotor indirectly is in mesh with the driveshafts via the sleeve.

According to another feature of the present invention, a connection element, such as a connecting flange or connecting device, may be provided for securing the housing to the extruder barrel. Suitably, the connection element may form an integral part of the housing and constructed as a bearing assembly for support of the driveshafts of the extruder screws. The bearing assembly may hereby be constructed as a radial bearing assembly.

According to another feature of the present invention, a lid assembly may be provided on a barrel-distal side of the housing. Suitably, the lid assembly may be provided with a bearing assembly constructed as axial bearing and/or radial bearing for support of the extruder screws, and may have a single-part or multi-part configuration.

According to another feature of the present invention, the lid assembly may be used to incorporate a cooling and lubrication of the distribution gear mechanism. In other words, cooling and lubrication may be integrated at the header side of the entire extruder. Suitably, the lid assembly may be formed with a cooling channel system for fluid communication with an external device. In this way, coolant can flow into the distribution gear mechanism or out of the distribution gear mechanism.

A drive apparatus according to the invention may be constructed for use in a twin-screw extruder rotating in a same direction, wherein the drive motor may be constructed so as to be electrically controllable.

BRIEF DESCRIPTION OF THE DRAWING

Other features and advantages of the present invention will be more readily apparent upon reading the following description of currently preferred exemplified embodiments of the invention with reference to the accompanying drawing, in which the sole

DETAILED DESCRIPTION OF PREFERRED EMBODIMENTS

Figure 1:
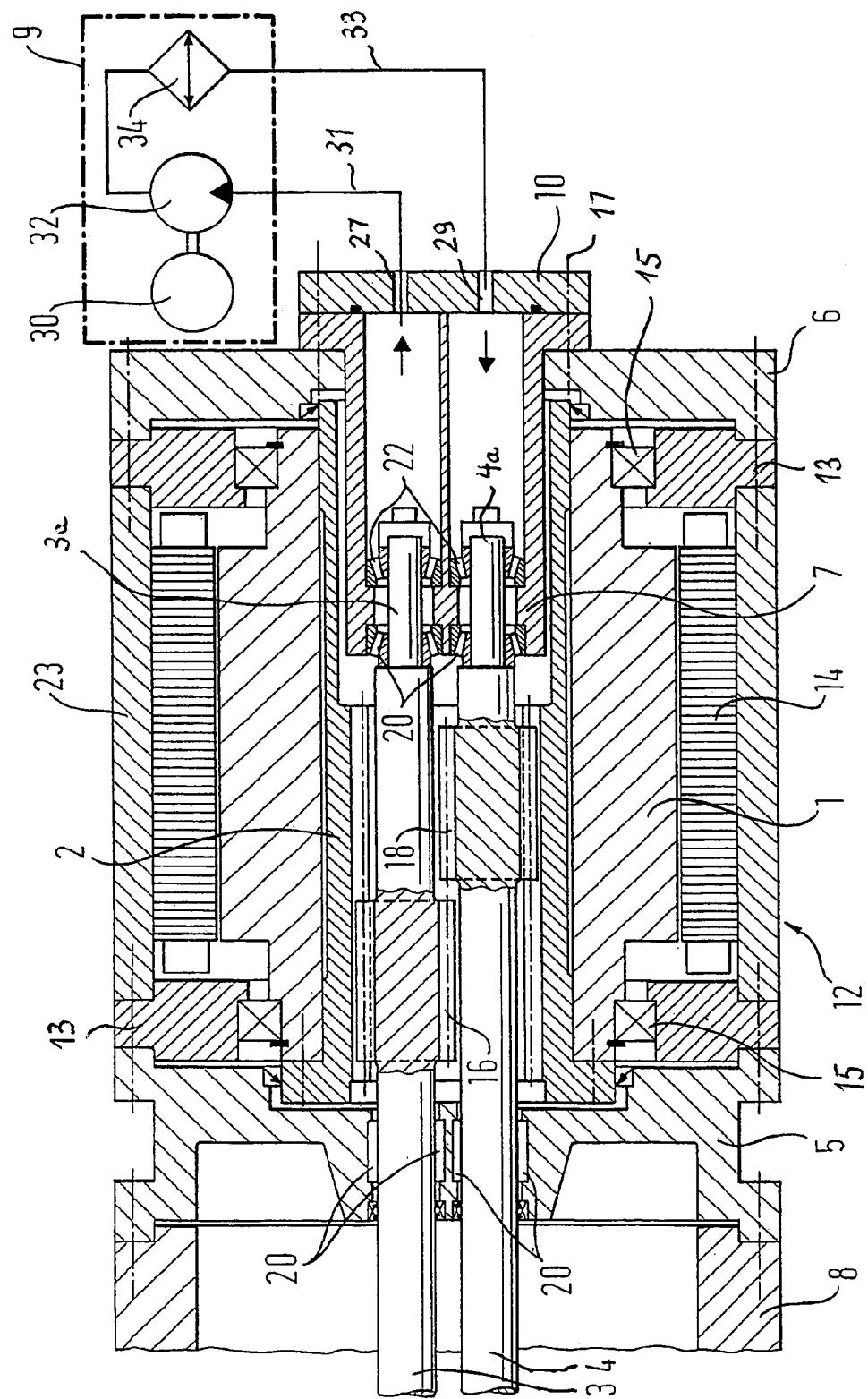
FIG. 1 shows a schematic sectional view of a drive apparatus according to the present invention.

The depicted embodiment is to be understood as illustrative of the invention and not as limiting in any way. It should also be understood that the drawing is not necessarily to scale and that the embodiment is sometimes illustrated by graphic symbols, phantom lines, diagrammatic representations and fragmentary views. In certain instances, details which are not necessary for an understanding of the present invention or which render other details difficult to perceive may have been omitted.

Turning now to FIG. 1, there is shown a schematic sectional view of a drive apparatus according to the present invention, including a housing 12 for accommodating a drive motor constructed as hollow-shaft motor with a stator 14 and a rotor 1. In the non-limiting example of FIG. 1, the housing 12 is of multi-part configuration and includes a substantially ring-shaped cooling jacket 23 as well as two end walls 13 which are arranged on opposite axial ends of the cooling jacket 23 and configured in the shape of a circular disk. Disposed radially inwards of the cooling jacket 23 is the stator 14 which has a ring-shaped configuration and is restrained against rotation. Disposed radially inwards of the stator 14 is the rotor 1 which has also a ring-shaped configuration and is axially supported by bearings 15 in both end walls 13 of the housing 12. The rotor 1 thus defines a hollow space and is securely fixed to a sleeve 2 arranged radially inwardly in the hollow space of the rotor 1 and provided with an internally toothed surface.

The housing 12 of the drive apparatus is mounted via a connection element in the form of a connecting flange 5 to an extruder barrel 8 which is only partly shown and accommodates two extruder screws (not shown). At their rear ends, the extruder screws have driveshafts 3, 4 which project beyond the end of the barrel 8 and extend into the cylindrical hollow space within the sleeve 2.

The driveshaft 3 includes a ring gear 16 having an outer toothed surface, and the driveshaft 4 includes a ring gear 18 having an outer toothed surface, whereby the ring gears 16, 18 are arranged in axially staggered configuration. The outer tooth surfaces of the ring gears 16, 18 mesh with the inner tooth surface of the sleeve 2 which is securely fixed to the rotor 1.

Disposed on the barrel-distal rear end (right-hand side in FIG. 1) of the drive apparatus is a three-part lid assembly comprised of an end cover 6, an inset 7 and a lid 10. The end cover 6 rests upon the confronting end wall 13 of the housing 12 and holds the inset 7 and the lid 10 in place. Dashdot line 17 designates the securement of the lid assembly by a screw, for example. The inset 7 and the lid 10 have each a portion that extends into the area of the cylindrical hollow space inside the sleeve 2, without establishing any contact to the sleeve 2.

Radial and axial bearings 20 as well as radial bearings 22 are arranged in the combined structure of inset 7 and lid 10 for support of rear shaft portions 3a, 4a of reduced size of the driveshafts 3, 4 of the extruder screws. The bearings 20 and 22 provide an axial and radial support of the rear shaft portions 3a, 4a.

Thus, the driveshafts 3, 4 are overall supported in a particularly reliable manner on both sides of the drive motor by the connecting flange 5, on one hand, and by the end cover 6, on the other hand.

The lid 10 of the lid assembly is further provided with channels 27, 29 via which a coolant and lubricant can be introduced for cooling and lubrication into the distribution gear mechanism by means of an external device 9. The external device 9 includes a motor 30, a pump 32, and a cooler 34 and has lines 31, 33 which are connected to the lid 10 such that coolant flows from the cooler 34 via line 33 and via channel 29 into the distribution gear mechanism and is returned via channel 27 and via line 31, as indicated by the arrows.

At operation of the drive motor, preferably a controllable drive motor, the rotor 1 causes the driveshafts 3, 4 to move via the attached sleeve 2 and its inner toothed surface. Thus, an integrated distribution gear mechanism with integrated support is overall realized on both sides of the motor. In combination with the hollow-shaft motor, provided in the nonlimiting example of FIG. 1, a very compact and powerful construction of the drive apparatus is realized. The structural depth of the drive apparatus only slightly exceeds the depth of the stator and rotor arrangement of the hollow-shaft motor, while the diameter of the drive apparatus only slightly exceeds the diameter of the hollow-shaft motor.

Moreover, assembly and disassembly of the drive apparatus is simple because it requires only a release of the not shown securement of the drive apparatus to the extruder barrel 8 to enable a simple withdrawal of the drive apparatus, when removal is desired, or a simple attachment, when assembly is desired. The need of a separate distribution gear mechanism and a separate step-down gear mechanism is eliminated.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A drive apparatus for an extruder with at least two co-rotating extruder screws having driveshafts, comprising:
   a housing; and
   a drive motor received in the housing and including a stator and a rotor, with the rotor operatively connected to the driveshafts of the extruder screws,
   wherein the rotor has arranged thereon a toothed surface in direct engagement with complementary toothed surfaces of at least two of the driveshafts of the extruder screws.

2. The drive apparatus of claim 1, wherein the drive motor is a hollow-shaft motor, with the stator configured substantially ring-shaped and with the rotor disposed radially inwards in relation to the stator and configured substantially ring-shaped, said rotor being hollow radially inwards to define a hollow space for receiving the driveshafts of the extruder screws.

3. The drive apparatus of claim 1, wherein the toothed surface is formed on the inside of the rotor, and the complementary toothed surfaces of the driveshafts of the extruder screws are formed by externally toothed ring gears.

4. The drive apparatus of claim 3, wherein the ring gears are arranged in axially staggered relationship.

5. The drive apparatus of claim 3, and further comprising a sleeve securely fixed to the rotor of the drive motor and constructed to form an internally toothed surface of the rotor.

6. The drive apparatus of claim 1, and further comprising a connection element for securing the housing to an extruder barrel.

7. The drive apparatus of claim 6, wherein the connection element is a connecting flange mounted to a barrel-proximal side of the housing and to a confronting end surface of the extruder barrel.

8. The drive apparatus of claim 6, wherein the connection element is an integral part of the housing.

9. The drive apparatus of claim 6, and further comprising a bearing assembly provide the connection element for support of the driveshafts of the extruder screws.

10. The drive apparatus of claim 9, wherein the bearing assembly is a radial bearing assembly.

11. The drive apparatus of claim 1, and further comprising a lid assembly provided on a barrel-distal side of the housing.

12. The drive apparatus of claim 11, wherein the lid assembly is of multi-part configuration and includes an end cover attached to a confronting end wall of the housing, an inset bearing upon the end cover and a lid attached to the inset.

13. The drive apparatus of claim 12, wherein the lid of the lid assembly is formed with a cooling channel for fluid communication with an external device.

14. The drive apparatus of claim 11, wherein the lid assembly is provided with a bearing assembly constructed as axial bearing and/or radial bearing for support of the driveshafts of the extruder screws.

15. The drive apparatus of claim 14, wherein the inset and the lid have each a portion extending into the rotor, said bearing assembly being supported by the portions of the inset and the lid.

16. The drive apparatus of claim 11, wherein the lid assembly is of single-part configuration.

17. The drive apparatus of claim 11, wherein the lid assembly is formed with a cooling channel for fluid communication with an external device.

18. The drive apparatus of claim 1, wherein the drive motor has an electric control.

* * * * *